(12) United States Patent
Lee

(10) Patent No.: US 6,236,039 B1
(45) Date of Patent: May 22, 2001

(54) ROTATION DETECTING DEVICE FOR RECORDING AND REPRODUCING APPARATUS AND METHOD THEREFOR

(75) Inventor: Soo Beom Lee, Koonpo (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/385,838

(22) Filed: Aug. 30, 1999

(30) Foreign Application Priority Data

Sep. 10, 1998 (KR) .................................................. 98-37420

(51) Int. Cl.[7] ........................................................ G01D 5/34
(52) U.S. Cl. ............................................ 250/231.13; 356/27
(58) Field of Search ........................ 250/231.13, 231.14, 250/231.16–231.18; 341/13, 31; 356/27, 28, 375; 369/44.23, 44.38

(56) References Cited

U.S. PATENT DOCUMENTS

| 3,654,480 | * | 4/1972 | Stephenson | 250/231.13 |
| 4,387,374 | * | 6/1983 | Wiener | 250/231.14 |
| 4,740,689 | * | 4/1988 | Swiden | 250/231.1 |
| 4,827,123 | * | 5/1989 | Gray | 341/13 |
| 5,220,161 | * | 6/1993 | Geis et al. | 250/231.13 |
| 5,729,006 | * | 3/1998 | Maeda | 369/44.23 |

\* cited by examiner

Primary Examiner—Stephone B. Allen
(74) Attorney, Agent, or Firm—Birch, Stewart, Kolasch & Birch, LLP

(57) ABSTRACT

The present invention relates to a rotation detecting device for a recording and reproducing apparatus and a method therefor which can easily precisely detect a reel rotation speed by a detecting sensor during a high or low speed rotation, by forming in a series equational division method a wing unit and a space unit of a sensor detecting member. In a rotation detecting device disposed at the recording and reproducing apparatus, and detecting a rotation speed of a rotation body rotated by a driving source, a rotation detecting device for a recording and reproducing apparatus includes: a sensor detecting member rotated in a single body with the rotation body, and provided with a plurality of wing units and a plurality of space units having an identical width, the plurality of wing units consisting of a plurality of wing strips and a plurality of assistant space units having an identical width; and a detecting sensor including a light emitting unit and a light receiving unit, and detecting a rotation speed by passing the plurality of wing units and the plurality of space units between the light emitting unit and the light receiving unit.

4 Claims, 5 Drawing Sheets

$$\begin{cases} D_1 = D_2 \\ D_3 = D_4 \\ nD_3 = D_2 \ (n=1,2,3,4,5\ldots) \end{cases}$$

ROTATION DETECTING DEVICE FOR RECORDING AND REPRODUCING APPARATUS AND METHOD THEREFOR

BACKGROUND OF THE INVENTION

1. Field of the Invention

The present invention relates to a rotation speed detecting device for a recording and reproducing apparatus, and a method therefor, and in particular to a rotation detecting device for a recording and reproducing apparatus which can exactly detect a rotation speed of a rotation member which is rotated at a high or low speed, and a method therefor. More particularly, the present invention relates to a rotation detecting device for a recording and reproducing apparatus and a method therefor which can easily precisely detect a rotation speed of a reel during a high- or low-speed rotation, and which can exactly detect a rotation speed of a motor of an optical disc recording and reproducing apparatus, by forming in a series equational division method a wing unit and a space unit of a sensor detecting member which is protrusively formed in a single body at a supply reel and a take-up reel of the recording and reproducing apparatus, such as a VCR.

2. Description of the Background Art

FIG. 1 is a schematic view illustrating an inside structure of a VCR which is a general recording and reproducing apparatus.

A capstan shaft 11 rotated to play a tape is provided at one side of a drum 10 including a rotation head, and a capstan pulley 12 rotated in a single body with the capstan shaft 11 is installed at the capstan shaft 11.

A pulley gear 13 is provided separately from the capstan pulley 12 by a predetermined distance. The pulley gear 13 is connected to the capstan pulley 12 by a belt 14, and thus a rotation of the capstan pulley 12 is transferred thereto.

At one side of the pulley gear 13 is provided an idle gear 15 engaged with the pulley gear 13, and moved and rotated to the right or left side in accordance with an operational mode of the recording and reproducing apparatus.

A supply side intermediate gear 16 and a take-up side intermediate gear 17 are provided at the right and left sides of the idle gear 15, respectively, and engaged with the idle gear 15 according to a right- or left-direction movement of the idle gear 15.

In addition, a supply reel 1 is provided to be engaged with the supply side intermediate gear 16, and a take-up reel 2 is disposed to be engaged with the take-up side intermediate gear 17. Accordingly, a rotation of the idle gear 15 is transferred to the supply side intermediate gear 16 or take-up side intermediate gear 17, thereby rotating the supply reel 1 or the take-up reel 2.

On the other hand, a rotation detecting device is provided to the recording and reproducing apparatus including the above-described components, in order to detect a rotation speed of the supply reel and the take-up reel when the tape is moved by a capstan motor. It will now be explained with reference to FIGS. 2 to 5.

FIG. 2 is a perspective view illustrating a detecting sensor measuring a rotation speed of the supply reel and the take-up reel for the general recording and reproducing apparatus. FIG. 3 is a circuit view illustrating a circuit constitution of the general detecting sensor. FIG. 4 is a perspective view illustrating a conventional sensor detecting member formed at a supply reel and a take-up reel for a general magnetic recording and reproducing apparatus. FIG. 5 is a graph showing an operational pulse in accordance with a conventional rotation speed detecting device.

Referring to FIGS. 2 to 5, in the rotation detecting device detecting a rotation speed of the supply reel and the take-up reel for the general recording and reproducing apparatus, a detecting sensor 7 including a light emitting unit 8 and a light receiving unit 9 as shown in FIG. 2 is disposed at each one side of the lower portions of the supply reel 1 and the take-up reel 2, and a ring-shaped sensor detecting member 20 is formed in a single body at the lower surfaces of the supply reel 1 and the take-up reel 2.

Here, a plurality of wing strips 30 and a plurality of space parts 40 which have an identical width ($W_1=W_2$) are alternately formed at the lower portion of the sensor detecting member 20 in accordance with the equational division method. The plurality of wing strips 30 and the plurality of space parts 40 are positioned between the light emitting unit 8 and the light receiving 9 of the detecting sensor 7, rotated when the supply reel 1 or the take-up reel 2 is rotated, and passed between the light emitting unit 8 and the light receiving unit 9 of the detecting sensor 7.

The rotation detecting device, namely the detecting sensor 7 and the sensor detecting member 20 may be provided at the supply side intermediate gear 16 and the take-up side intermediate gear 17, respectively.

Reference mark Vcc denotes a voltage, $R_1$, $R_2$, $R_3$ denote resistances, and $C_1$ denotes a condenser.

The operation of the recording and reproducing apparatus including the above-described rotation detecting device, and the rotation speed detecting operation of the rotation detecting device will now be described.

When an operational command is provided to the recording and reproducing apparatus, the capstan shaft 11 is rotated. As the capstan shaft 11 is rotated, the capstan pulley 12 formed in a single body with the capstan shaft 11 is rotated.

When the capstan pulley 12 is rotated, the pulley gear 13 connected to the capstan pulley 12 by the belt 14 is rotated, and thus the idle gear 15 engaged with the pulley gear 13 is rotated. Here, the idle gear 15 is moved to the right or left side according to an initial operational command, and then rotated.

Thereafter, the idle gear 15 is moved to the right or left side, and thus selectively engaged with the supply side intermediate gear 16 or the take-up side intermediate gear 17 respectively disposed at the left and right sides thereof. As a result, the supply side intermediate gear 16 or the take-up side intermediate gear 17 is rotated, and thus the supply reel 1 or the take-up reel 2 engaged respectively with the supply side intermediate gear 16 or the take-up side intermediate gear 17 is rotated.

Accordingly, as the supply reel 1 or the take-up reel 2 is rotated, the sensor detecting member 20 formed in a single body at the lower surface of the supply reel 1 or the take-up reel 2 is rotated, and thus the plurality of wing strips 30 and the plurality of space parts 40 of the sensor detecting member 20 are alternately passed and rotated between the light emitting unit 8 and the light receiving unit 9 of the detecting sensor 8.

Therefore, when the detecting sensor member 20 is passed and rotated through the detecting sensor 7, if the space part 40 is passed therethrough, a light generated from the light emitting unit 8 of the detecting sensor 7 is transmitted to the light receiving unit 9, and thus a microcomputer (not shown) disposed at a circuit unit recognizes a rotation of the supply reel 1 or the take-up reel 2.

Since the conventional detecting sensor member 20 includes the plurality of wing strips 30 and the plurality of space parts 40 having an identical width ($W_1=W_2$) according to the equational division method, if the wing strips 30 and the space parts 40 are widely formed, and the supply reel 1 or the take-up reel 2 is rotated at a high speed, the sensor detecting member 20 can detect the rotation of the supply reel 1 or the take-up reel 2, and transmit a data in order for the microcomputer (not shown) to recognize the rotation without an error. However, in the case of a slight rotation of $\frac{1}{10} \sim \frac{1}{20}$, the detecting sensor 7 can detect the rotation only when a rotation angle of the supply reel 1 or the take-up reel 2 is increased. In case the rotation angle of the supply reel 1 or the take-up reel 2 is small, the wing strip 30 or the space part 40 is positioned at the detecting sensor 7, and thus the detecting sensor 7 is not varied.

That is to say, when at least a pair of wing strip 30 and space part 40 of the sensor detecting member 20 is passed between the light emitting unit 8 and the light receiving unit 9 of the detecting sensor 7, the detecting sensor 7 can detect the rotation.

To the contrary, when the wing strip 30 and the space strip 40 of the detecting sensor 20 are narrowly formed, the supply reel 1 or the take-up reel 2 is slightly rotated, the microcomputer can be operated without an error. However, at a high-speed rotation, a passing speed is also high, and thus a light from the light emitting unit 8 of the detecting sensor 7 cannot be sufficiently transmitted to the light receiving unit 9 thereof, and does not reach to a reference voltage. Accordingly, the microcomputer (not shown) cannot recognize the rotation of the reel.

As a result, a strip width of the detecting sensor member is determined by taking an average value of the recognition values of the microcomputer according to the rotation speed, and thus an optimal state of performance cannot be embodied. In addition, it is disadvantageous to maintain two kinds of units in accordance with a property of a model.

SUMMARY OF THE INVENTION

Accordingly, it is an object of the present invention to provide a rotation detecting device for a recording and reproducing apparatus and a method therefor which can easily and precisely detect a rotation speed during a high- or low-speed rotation by forming in a series equational division method a wing unit and a space unit of a sensor detecting member passing through a detecting sensor in order to detect a rotation speed of a rotation body of the recording and reproducing apparatus, and which can detect a defect, such as a tape loosening in advance at a slight rotation control region by performing a perfect control during the high-speed, low-speed or slight rotation.

In order to achieve the above-described object of the present invention, in a rotation detecting device disposed at a recording and reproducing apparatus, and detecting a rotation speed of a rotation body rotated by a driving source, there is provided a rotation detecting device for the recording and reproducing apparatus, including: a sensor detecting member rotated in a single body with the rotation body, and provided with a plurality of wing units and a plurality of space units having an identical width, the plurality of wing units consisting of a plurality of wing strips and a plurality of assistant space units having an identical width according to a series equational division method; and a detecting sensor having a light emitting unit and a light receiving unit, and detecting a rotation speed by passing the plurality of wing units and the plurality of space units between the light emitting unit and the light receiving unit.

In addition, in order to achieve the above-described object of the present invention, in a rotation detecting method for detecting a rotation speed of a rotation body disposed at a recording and reproducing apparatus, and rotated by a driving source, there is provided a rotation detecting method for the recording and reproducing apparatus wherein a sensor detecting member formed in a single body with the rotation body, and rotated therewith alternately includes a plurality of wing units having a predetermined width and a plurality of space units having a width identical to or greater than the wing units, the plurality of wing units consists of a plurality of wing strips and a plurality of assistant space units in accordance with a series equational division method, a rotation of the rotation body is detected according to a signal detected from the plurality of wing units and the plurality of space units during a high-speed rotation, and the rotation of the rotation body is detected according to a signal detected from the plurality of wing strips and the plurality of assistant space units during a low-speed rotation.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

A rotation detecting device for a recording and reproducing apparatus and a method therefor in accordance with a preferred embodiment of the present invention will now be described with reference to the accompanying drawings.

Figure 6:
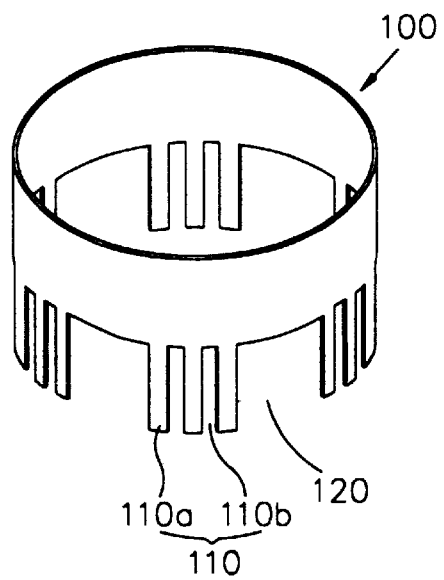
FIG. 6 is a graph showing a sensor detecting member in accordance with the present invention.
Figure 7:
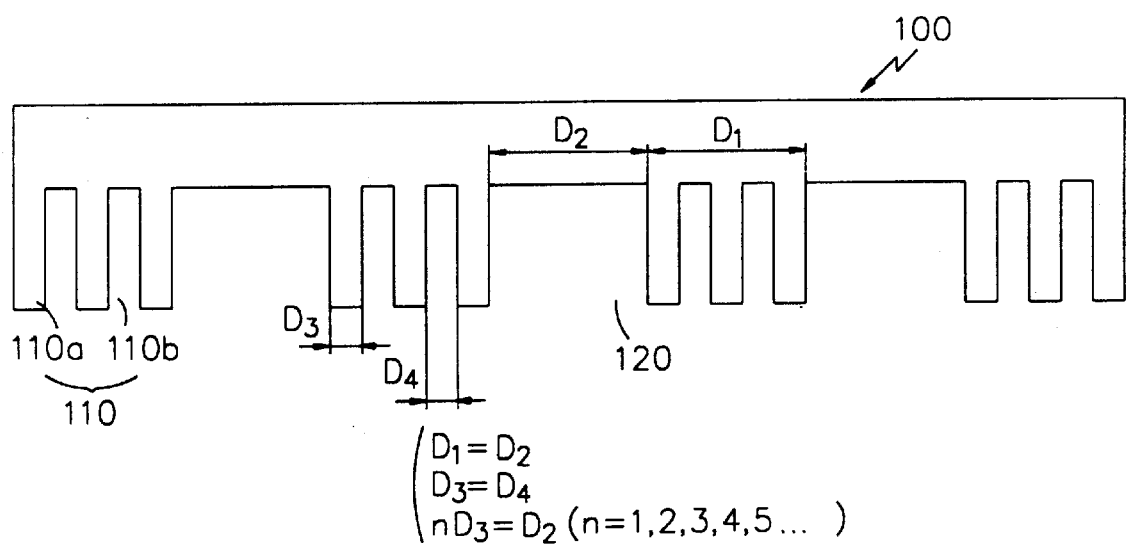
FIG. 7 is a development view illustrating the sensor detecting member in accordance with the present invention.

FIG. 6 is a perspective view illustrating a sensor detecting member in accordance with the present invention, and FIG. 7 is a development view illustrating a sensor detecting member in accordance with the present invention.

Figure 8A:
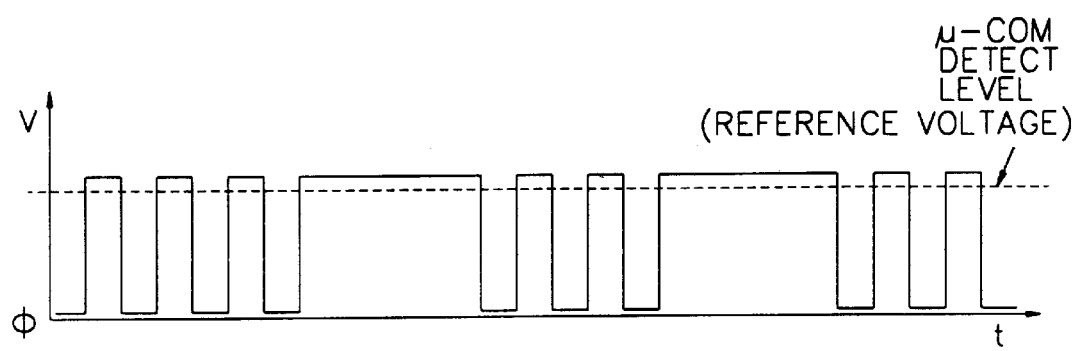
FIG. 8A is a graph showing an operational pulse during a low-speed rotation in accordance with a rotation speed detecting device of the present invention.
Figure 8B:
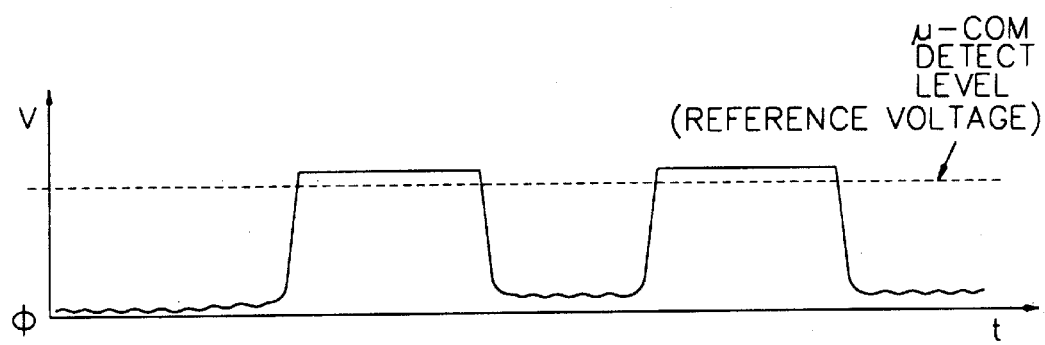
FIG. 8B is a graph showing an operational pulse during a high-speed rotation in accordance with the rotation speed detecting device of the present invention.

FIGS. 8A and 8B are graphs respectively showing an operational pulse during a high- and low-speed rotation in accordance with the rotation detecting device of the present invention. Identical components to the conventional art are not illustrated, and are provided with the same reference numerals.

The detecting sensor 7 having the light emitting unit 8 and the light receiving unit 9 is identical to the conventional art, and thus the explanation thereof is omitted. Therefore, a sensor detecting member formed in a single body at the lower surfaces of the supply reel 1 and the take-up reel 2, and passed and rotated between the light emitting unit 8 and the light receiving unit 9 of the detecting sensor 7 will now be described.

Referring to FIGS. 6 and 7, the sensor detecting member 100 is formed in a ring shape. A plurality of wing units 110 and a plurality of space units 120 ($D_1=D_2$) are alternately formed at the lower portion of the sensor detecting member 100. The plurality of wing units 110 consist of a plurality of wing strips 110a and a plurality of assistant space units 110b which have an identical width ($D_3=D_4$).

That is, in the sensor detecting member 100 in accordance with the present invention, a width $D_3$ of each wing strip 110a composing the wing unit 110 is identical to a width $D_4$ of the assistant space unit 110b between the wing strips 110a. A width $D_1$ of the wing unit 110 which is the sum of the width $D_3$ of the plurality of wing strips 110a and the width $D_4$ of the plurality of assistant space units 110b is identical to a width $D_2$ of the space unit 120.

Here, the width $D_2$ of the space unit 120 may be greater than the width $D_1$ of the wing unit 110.

Accordingly, the sensor detecting member 100 functions as a device and a circuit. That is, in regard to a device property, the plurality of wing units 110 and the plurality of space units 120 having an identical width ($D_1=D_2$) are alternately formed at the lower portion of the sensor detecting member 100. Each of the wing units 110 consists of the plurality of wing strips 110a and the plurality of assistant space units 110b which have an identical width ($D_1=D_4$) according to the series equational division method.

The rotation speed detecting operation of the rotation detecting device in accordance with the present invention will now be described.

The operation of the recording and reproducing apparatus which is performed before the rotation speed detecting operation is identical to the conventional art, and thus an explanation thereof is omitted. The rotation speed detecting operation will now be described.

When the supply reel 1 or the take-up reel 2 of the VCR, the recording and reproducing apparatus is rotated, the sensor detecting member 100 formed in a single body at the lower surfaces of the supply reel 1 and the take-up reel 2 is rotated, and thus the wing units 110 and the space units 120 of the sensor detecting member 100 are alternately passed and rotated between the light emitting unit 8 and the light receiving unit 9 of the detecting sensor 7. Accordingly, a light generated form the light emitting unit 8 of the detecting sensor 7 is transmitted to the light receiving unit 9, and thus a microcomputer (not shown) disposed at a circuit unit (not shown) recognizes a rotation of the supply reel 1 or the take-up reel 2.

Here, in the case that the supply reel or the take-up reel 2 is rotated at a high speed, as illustrated in FIG. 8B, when the wing unit 110 is passed through the detecting sensor 7, an output voltage is smaller than the reference voltage. When the space unit 120 is passed through the detecting sensor 7, an output voltage is greater than the reference voltage. Accordingly, the microcomputer counts the voltage greater than the reference voltage, and detects a rotation speed.

That is, the microcomputer recognizes the rotation merely through the wing units 110 and the space units 120 of the sensor detecting member 100 which have an identical width ($D_1=D_2$), and counts a pulse thereof.

On the other hand, when the supply reel 1 or the take-up reel 2 is rotated at a low speed, the microcomputer recognizes the rotation merely at a region where a width of the sensor detecting member 100 is narrow.

As illustrated in FIG. 8A, since the reel is rotated at a low speed, when the wing units 110 are passed through the sensor 7, the output voltage greater than the reference voltage is outputted, and thus the microcomputer can count the pulse.

That is to say, the microcomputer recognizes the rotation merely through the wing strips 110a and the assistant space units 110b of the wing units 110 having an identical width ($D_3=D_4$), and counts the pulse.

Figure 1:
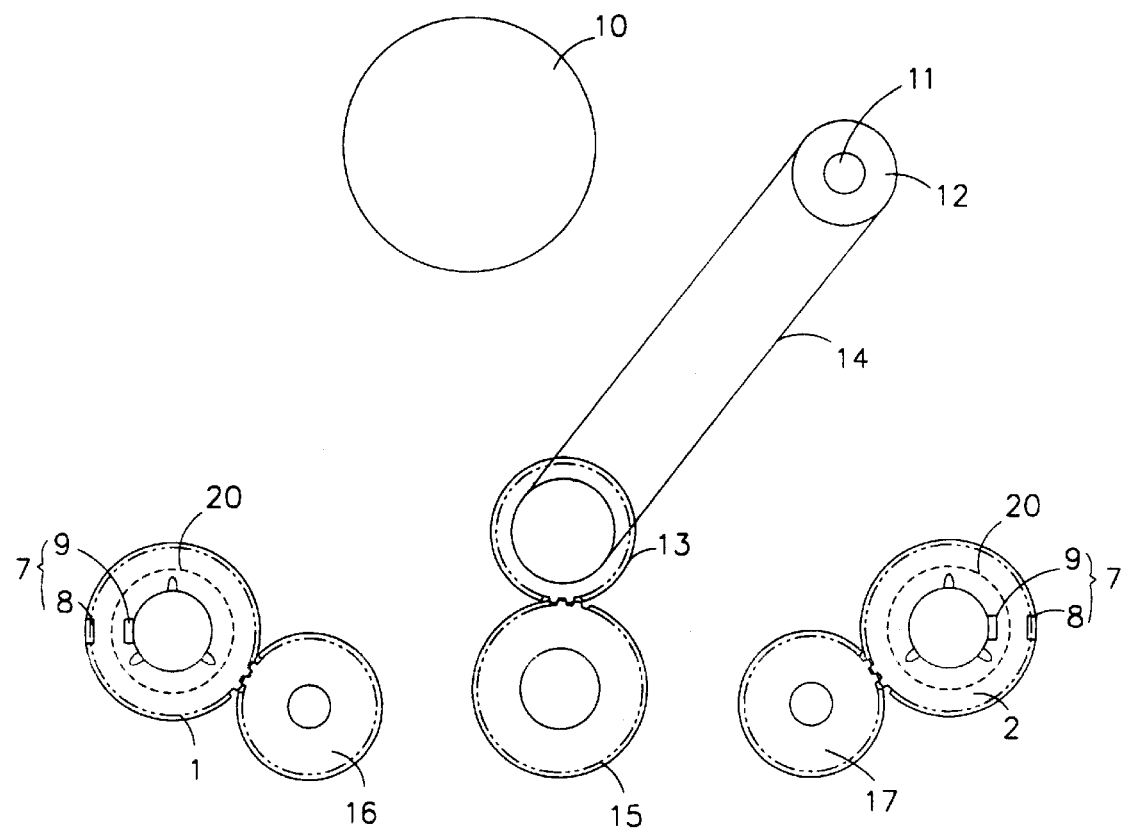
FIG. 1 is a schematic view illustrating an inside structure of a VCR which is a general recording and reproducing apparatus.
Figure 2:
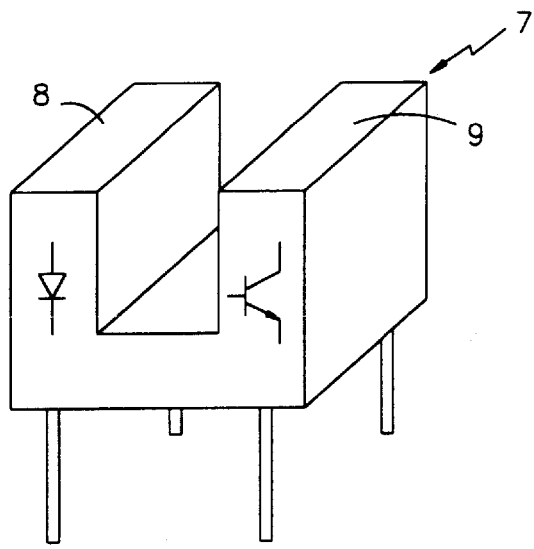
FIG. 2 is a perspective view illustrating a detecting sensor for measuring a rotation speed of a supply reel and a take-up reel of the general recording and reproducing apparatus.
Figure 3:
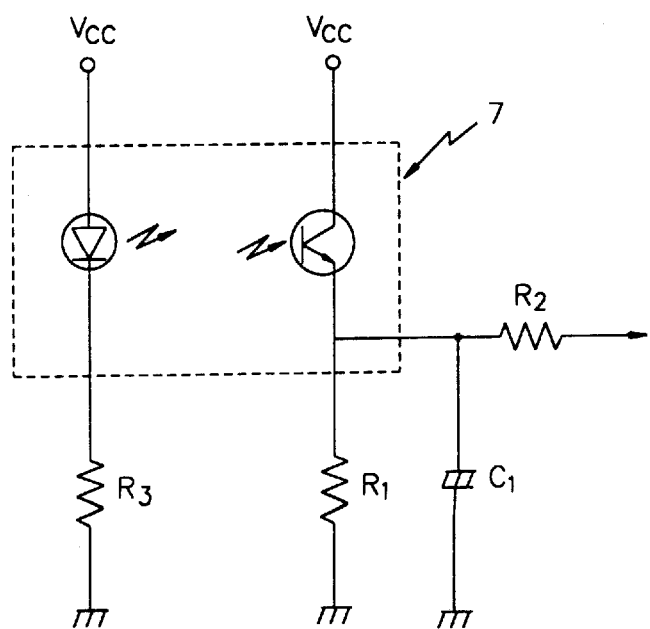
FIG. 3 is a circuit view illustrating a circuit constitution of the conventional detecting sensor.
Figure 4:
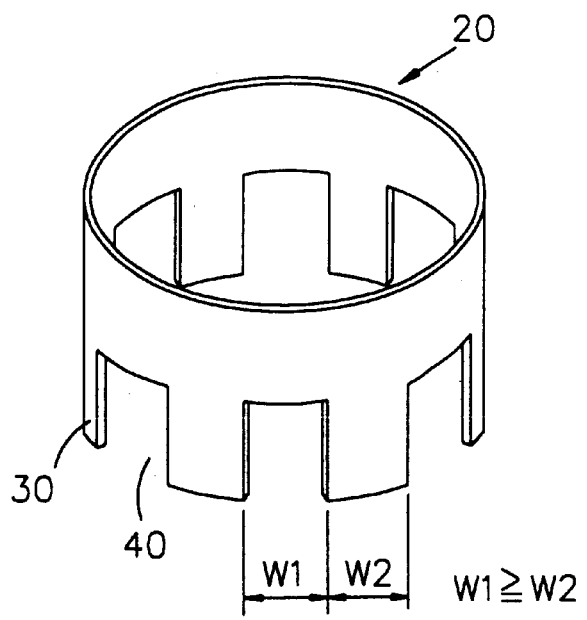
FIG. 4 is a perspective view illustrating a conventional sensor detecting member formed in a single body at the lower surfaces of the supply reel and the take-up reel of the general recording and reproducing apparatus.
Figure 5:
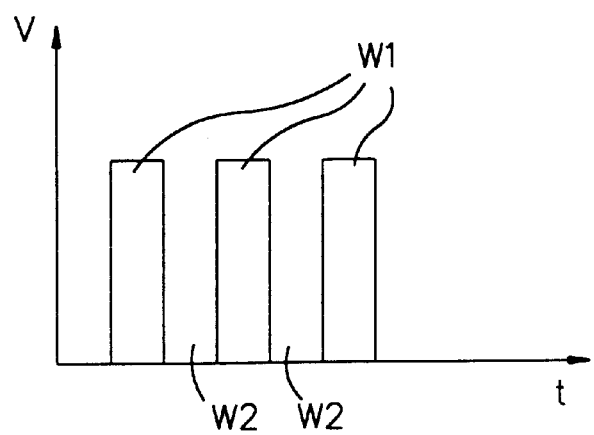
FIG. 5 is a graph showing an operational pulse in accordance with a conventional rotation speed detecting device.

Here, in the case that the supply reel 1 or the take-up reel 2 is rotated at a low speed, in order to achieve a waveform as shown in FIG. 8A, a time constant of $R_1$ and $C_1$ of the detecting sensor 7 as shown in FIG. 3 is adjusted and set. In addition, when the supply reel 1 or the take-up reel 2 is rotated at a high speed, in order to achieve a waveform as shown in FIG. 8B, a time constant of $R_1$ and $C_1$ of the detecting sensor 7 is adjusted and set.

Accordingly, the microcomputer uses a data through a region having a narrow width, namely the wing strips 110a and the assistant space units 110b of the wing units 110 during the low-speed rotation, and utilizes all data during the high-speed rotation. As a result, the high- and low-speed rotation of the supply reel 1 or the take-up reel 2 can be efficiently detected.

As discussed earlier, the rotation detecting device for the recording and reproducing apparatus and the method therefor can easily exactly detect the rotation speed of the reel during the high- or low-speed rotation.

In addition, a perfect control can be performed during the high- and low-speed rotation, thereby detecting a defect, such as a tape loosening in advance in a slight rotation control region. Components can be easily maintained according to a property of the VCR model, which results in improved efficiency and reliability.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a rotation detecting device disposed at a recording and reproducing apparatus, and detecting a rotation speed of a rotation body rotated by a driving source, a rotation detecting device for the recording and reproducing apparatus, comprising:

a sensor detecting member rotated in a single body with the rotation body, and provided with a plurality of wing units and a plurality of space units having an identical width, the plurality of wing units consisting of a plurality of wing strips and a plurality of assistant space units having an almost identical width; and a detecting sensor including a light emitting unit and a light receiving unit, and detecting a rotation speed by passing the plurality of wing units and the plurality of space units between the light emitting unit and the light receiving unit.

2. The rotation detecting device according to claim 1, wherein a width of each of the space units is greater than that of each of the wing units.

3. In a rotation detecting method for detecting a rotation speed of a rotation body disposed at a recording and reproducing apparatus, and rotated by a driving source, a rotation detecting method for the recording and reproducing apparatus wherein a sensor detecting member formed in a single body with the rotation body, and rotated therewith alternately includes a plurality of wing units and a plurality of space units, the plurality of wing units consists of a plurality of wing strips and a plurality of assistant space units, a rotation of the rotation body is detected according to a signal detected from the wing units and the space units during a high-speed rotation, and the rotation of the rotation body is detected according to a signal detected from the wing strips and the assistant space units during a low-speed rotation.

4. In a rotation detecting method for detecting a rotation speed of a rotation body disposed at a recording and reproducing apparatus, and rotated by a driving source, a rotation detecting method for the recording and reproducing apparatus wherein a sensor detecting ring formed in a single body with the rotation body, and rotated therewith alternately includes a plurality of wing units having a predetermined width and a plurality of space units having a width identical to or greater than the wing units, the plurality of wing units consists of a plurality of wing strips and a plurality of assistant space units, a rotation of the rotation body is detected according to a signal detected from the plurality of wing units and the plurality of space units during a high-speed rotation, and the rotation of the rotation body is detected according to a signal detected from the plurality of wing strips and the plurality of assistant space units during a low-speed rotation.

* * * * *